US008103753B2

(12) United States Patent
Taylor et al.

(10) Patent No.: US 8,103,753 B2
(45) Date of Patent: Jan. 24, 2012

(54) DISTRIBUTING MEMBERSHIP INFORMATION FOR MULTI-PARTY APPLICATION LAYER SESSIONS

(75) Inventors: John Anthony Taylor, Bellevue, WA (US); Wei Zhong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 2383 days.

(21) Appl. No.: 10/420,986

(22) Filed: Apr. 22, 2003

(65) Prior Publication Data

US 2004/0215667 A1    Oct. 28, 2004

(51) Int. Cl.
 G06F 15/16    (2006.01)
 G06F 15/177    (2006.01)

(52) U.S. Cl. ........................................ 709/222; 709/204
(58) Field of Classification Search .................. 709/204, 709/223; 370/254
 See application file for complete search history.

(56) References Cited

U.S. PATENT DOCUMENTS

| 5,805,578 | A | 9/1998 | Stirpe et al. | |
|---|---|---|---|---|
| 6,530,032 | B1 | 3/2003 | Shew et al. | |
| 6,578,086 | B1* | 6/2003 | Regan et al. | 709/242 |
| 7,120,681 | B2* | 10/2006 | Frelechoux et al. | 709/221 |
| 7,171,476 | B2* | 1/2007 | Maeda et al. | 709/227 |
| 7,248,579 | B1* | 7/2007 | Friedman | 370/389 |
| 7,310,335 | B1* | 12/2007 | Garcia-Luna-Aceves et al. | 370/390 |
| 7,391,741 | B2* | 6/2008 | Kang | 370/254 |
| 7,590,048 | B2* | 9/2009 | Doukai | 370/217 |
| 7,613,772 | B2* | 11/2009 | Bartram et al. | 709/205 |
| 7,633,854 | B2* | 12/2009 | Saleh et al. | 370/216 |
| 7,633,875 | B1* | 12/2009 | Harper | 370/238 |
| 8,023,515 | B2* | 9/2011 | Dobbins et al. | 370/395.53 |
| 8,036,139 | B2* | 10/2011 | Kouvelas | 370/254 |
| 2002/0105917 | A1 | 8/2002 | Rabipour et al. | |
| 2003/0067925 | A1* | 4/2003 | Choe et al. | 370/400 |
| 2003/0179742 | A1* | 9/2003 | Ogier et al. | 370/351 |
| 2003/0212829 | A1* | 11/2003 | Schofield et al. | 709/250 |
| 2004/0018839 | A1* | 1/2004 | Andric et al. | 455/433 |
| 2004/0114595 | A1* | 6/2004 | Doukai | 370/389 |
| 2004/0148333 | A1* | 7/2004 | Manion et al. | 709/201 |
| 2008/0077710 | A1* | 3/2008 | Kouvelas et al. | 709/250 |
| 2010/0146106 | A1* | 6/2010 | Bartram et al. | 709/224 |

OTHER PUBLICATIONS

"A Novel Group Coordination Protocol for Collaborative Multimedia Systems" H.P. Dommel and J.J. Garcia-Luna-Aceves, Computer Engineering Department, School of Engineering, University of California, Santa Cruz, CA 95064, USA 1998 IEEE p. 1225 to 1230.
Rosenberg, et al., "SIP: Session Initiation Protocol," Internet Engineering Task Force, Feb. 27, 2002 (194 pages).

(Continued)

*Primary Examiner* — Kevin Bates
*Assistant Examiner* — Benjamin Ailes
(74) *Attorney, Agent, or Firm* — Perkins Coie LLP (57) ABSTRACT

Membership information for participating computer systems participating in a multi-party conferencing session is distributed by intermittently exchanging link databases with one or more neighbor computer systems. A link database includes one or more link state records, each link state record identifying a participating computer systems and a list of neighbor computer systems that are logically linked to the participating computer system. When a new computer system joins or a participating computer system leaves the multi-party session this joining or leaving change is reflected in the link databases of corresponding neighbor computer systems. As the neighbor computer systems exchange link databases, the change is eventually propagated to all the participating computer systems. Accordingly, participant computer systems continually transition towards a steady state where each participant computer system is aware of other participant computer systems and logical links associated with other participant computer systems.

16 Claims, 5 Drawing Sheets

OTHER PUBLICATIONS

Cordell, et al., "H.323—A Key to the Multimedia Future," BT Technology Journal, BT Laboratories, vol. 19, No. 2, Apr. 1, 2001 (pp. 89-106).

European Search Report for European Patent Application No. EP05010248, Aug. 10, 2005 (2 pages).

* cited by examiner

DISTRIBUTING MEMBERSHIP INFORMATION FOR MULTI-PARTY APPLICATION LAYER SESSIONS

BACKGROUND OF THE INVENTION

1. The Field of the Invention

The present invention relates to computer networks, and more specifically, to distributing membership information for multi-party application layer sessions.

2. Background and Relevant Art

Computer networks have enhanced our ability to communicate and access information by allowing one computer or device (hereinafter both referred to as a "computing system") to communicate over a network with another computing system using electronic messages. When transferring an electronic message between computing systems, the electronic message will often pass through a protocol stack that performs operations on the data within the electronic message (e.g., packetizing, routing, flow control). The Open System Interconnect ("OSI") model is an example of a networking framework for implementing a protocol stack.

The OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to higher intermediate layers and then eventually received at the application layer. The application layer, the upper most layer, is responsible for supporting applications and end-user processes, such as, for example, electronic conferencing software.

The functionality of lower layers of a protocol stack is typically abstracted from the application layer. That is, application data is transferred to and from an application layer through the lower layers without exposing the functionality of the lower layers to the application layer. Abstraction can make it appear to a number of application layer processes at different computing systems that the application layer processes are directly connected to one another (when in fact lower layers in corresponding protocol stacks process data as the data transferred between the application layer processes). Accordingly, communication between two application layer processes can be viewed as a logical connection regardless of the underlying physical network that facilitates the communication.

Often, when computing systems are to communicate with each other, the computing systems will first establish a communication session. This can include application layer processes at a number of different computing systems establishing a multi-party application layer session, such as, for example, a multi-party conferencing session. To establish a multi-party conferencing session, conferencing applications at each of the computing systems logically connect to one another. The logical connections typically result in the computing systems being configured in a logical hierarchy, such as, for example, of a T.120 conferencing session.

The logically connected conferencing applications then select a controlling computing system as the root of the logical hierarchy. Other computing systems in the logical hierarchy can be leaf computing systems (computing systems with no other computing systems below them in the logical hierarchy) or intermediate computing systems (computing systems somewhere between the root computer system and a leaf computing system in the logical hierarchy). The controlling computing system facilitates the transfer of conferencing data between the other computing systems in the logical hierarchy. Each intermediate and leaf computing system maintains link information (associated with a logical connections) for sending conferencing data to and receiving conferencing data from the root computing system. Likewise, the controlling computing system maintains link information for sending conferencing data to and receiving conferencing data from each intermediate and leaf computing system.

Typically, conferencing data originates at an intermediate or leaf computing system in one branch of the logical hierarchy. The intermediate or leaf computing system transfers the conferencing data up the logical hierarchy to the controlling computing system. The controlling computing system then transfers the conferencing data down the logical hierarchy to all the intermediate and leaf computing systems in the logical hierarchy. Accordingly, during a typical conferencing session, all conferencing data flows through the controlling computing system.

However, an intermediate or leaf computing system in one branch of the logical hierarchy does not typically communicate directly with intermediate or leaf computing systems in any other branch of the logical hierarchy. Accordingly, there is little, if any, need for intermediate and leaf computing systems in one branch of the logical hierarchy to maintain link information for intermediate and leaf computing systems in other branches of the logical hierarchy. Since all conferencing data flows through the controlling computing system, failure of an intermediate or leaf computing system does not impact the transfer of conferencing data to computing systems outside the corresponding branch that includes the failing computing system. Accordingly, conferencing data can still be transferred to computing systems in other branches when an intermediate or leaf computing system fails.

Unfortunately in a logical hierarchy, failure of a controlling root computing system can have a significant detrimental impact on the transfer of conferencing data for a multi-party conferencing session. When a controlling root computing system fails, other computing systems in the logical hierarchy transition into election mode. During election mode, transfer of conferencing data is suspended, while the other computing systems attempt to elect a new controlling root computing system.

The election algorithms typically implemented to elect a new root controlling computing system can be quite complex and take on the order of a few seconds to complete. Since no data is transferred during election mode, the user experience is significantly degraded during execution of election algorithms. It may also be that the other computing systems do not initially agree on the computing system that should be elected as the root controlling computing system. Thus, election algorithms may be executed a number of times, continuing until appropriate electron results are achieved. This can lengthen the election process and further degrade the user experience. Further, it may be that appropriate election results are not achieved (i.e., election algorithms fail to automatically elect a new controlling computing system). Accordingly, the expertise of a system administrator may be required to reset the multi-party conferencing session and/or select a new controlling root computing system.

Additional computing systems may also be preventing from joining a multi-party conferencing session when the computing systems of the multi-party conferencing session are in election mode. A user a computing system attempting to join the multi-party conferencing session during election mode may be given a false indication that the multi-party conferencing session does not exist. This can result in the user terminating further efforts to connect to the multi-party conferencing session even though the multi-party conferencing session is established and conferencing data may (once a new controlling root computing system is elected) subsequently continue to be transferred. Therefore systems, methods, computer program products, and data structures for distributing membership information for multi-party application layer sessions would be advantageous.

BRIEF SUMMARY OF THE INVENTION

The foregoing problems with the prior state of the art are overcome by the principles of the present invention, which are directed towards methods, systems, computer program products, and data structures for distributing membership information for multi-party application layer sessions. A multi-party application layer session, such as, for example a multi-party conferencing session, includes a number of participating computer systems. A number of different network technologies (e.g., Ethernet, Token Ring, 802.11, etc.) may physically connect different participating computer systems to the multi-party conferencing session. Conferencing applications at each of the participating computer systems are logically linked to one another (i.e., conferencing application links are abstracted from the physical connections) resulting in a logical graph, such as, for example, a hierarchical tree. It may be that a conferencing application at one participating computing system is logically linked to conferencing applications at a number of other participating computing systems.

A joining computer system can attempt to join the multi-party conferencing session (or indicate to the multi-party conferencing session that it is still alive) by sending a hello message to an inviting computer system that may already be participating in a multi-party conferencing session. The inviting computer system receives the hello message and updates an inviting side link database to indicate that the inviting computer system is logically linked to the joining computer system. The inviting side computer system sends the updated inviting side link database to the joining computer system. The updated inviting side link database includes at least an inviting side link state record indicating that the inviting computer system is logically linked to the joining computer system. When the inviting computer system is already participating in the multi-party conferencing session, the inviting side link database can include link state records for other participating computer systems.

A link state record includes at least a computer system identifier, a time stamp, and a list of logical links to neighbor computer systems. Thus, when a joining computer system joins a multi-party conferencing session, the joining computer system can receive a link database including other participating computer systems and the logical links that connect other participating computer systems. Accordingly, when one participating computer system fails, the other participating computer systems can more easily recover from the failure and the multi-party conferencing session can continue without significantly degrading the user experience.

The joining computer system receives the updated inviting side link database and potentially updates a joining side link database with link state records from the inviting side link database. Updating a joining side link database can include comparing time stamps in the joining side link database to time stamps in the received inviting side link database. When a link state record in the received inviting side link database is more recent, the joining side link database can be updated with the link state record from the received inviting side link database. When the joining side link database has no link state record for a participating computer system, a corresponding link state record from the received inviting side link database is used to update the joining side link database.

When appropriate, the joining computer system also inserts (or updates) a joining side link state record in the joining side link database to indicate that the joining computer system is logically linked to the inviting computer system. The joining computer system sends the joining side link state record to the inviting computer system. The inviting computer system can forward the receiving side link state record (as well as the updated inviting side link database) to other participating computer systems. Accordingly, participant computer systems continually transition towards a steady state where each participant computer system is aware of other participant computer systems and logical links associated with other participant computer systems.

In some embodiments, a repairing computer system detects that link data is no longer being received from a neighbor computer system (e.g., a participating computer system indicated as being logically linked to the repairing computer system in a repairing side link state record). Accordingly, the repairing computer system removes the neighbor computer system from the repairing computer system's list of neighbor computer systems (e.g., contained in the repairing side link state record) and removes the neighbor computer system's link state record from a repairing side link database. The repairing computer system identifies a list of logically unreachable participant computer systems based on link data in the repairing side link database. The repairing computer system attempts to join at least one logically unreachable participant computer system so as to repair the multi-party conferencing session.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for distributing membership information for multi-party application layer sessions. Participant computer systems in a multi-party conferencing session intermittently send heartbeat messages to other participant computer systems to verify logically links previously established between the participant computer systems. Similarly, a joining computer system can send a hello message (which is essentially a heartbeat message that introduces the joining computer system to the inviting computer system) to a participant computer system to attempt to join the multi-party conferencing session. In response to receiving a hello message, a participant computer system returns one or more link state records to the computer system (either participating or joining) that sent the hello message. The computer system that sent the hello message can use the returned one or more link state records to update a link database of participating computer systems. Each link state record can include a computer system identifier identifying a participant computer system, a time stamp, and a list of the participant computer system's neighbor computer systems.

In some embodiments, a repairing computer system detects that link data is no longer being received from a neighbor computer system (e.g., no link state records are received in response to a heartbeat message). In response to detecting that link data is no longer being received, the repairing computer system removes link data associated with the neighbor computer system from a repairing side link database. The joining computer system attempts to repair the multi-party conferencing session by connecting to at least one logically unreachable participant computer system. When a logical link is established, the repairing side database can be propagated to other participating computer systems. Accordingly, participant computer systems continually transition into a steady state where each participant computer system is aware of logical links between other participant computer systems.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-t executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that enables the transport of electronic data between two entities such as computer systems or modules. The actual physical representation of a communication path between two entities is not important and may change over time, such as, for example, when a routing path is changed. A logical communication link may include portions of a system bus, a local area network, a wide area network, the Internet, combinations thereof, or portions of any other path that facilitates the transport of electronic data. Logical communication links are defined to include hardwired links, wireless links, or a combination of hardwired links and wireless links. Logical communication links can also include software or hardware modules that condition or format portions of data so as to make the portions of data accessible to components that implement the principles of the present invention (e.g., proxies, routers, gateways, etc).

In this description and in the following claims, a "schema" is defined as an expression of a shared vocabulary between a plurality of computer systems that allows the plurality of computer systems to process documents according the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actually file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. XML elements, attributes, and attribute values can be represented by data types that are defined in a schema. In this definition and the following claims, "schema-based" refers to being defined by and/or in accordance with a schema.

In this description and the following claims, "link data" is defined generally to include, but is not limited to, any information associated with a computer system's links to other computer systems in a multi-party conferencing session. Link data is defined to include link databases, link state records, computer system identifiers, timestamps, and neighbor lists. Link data is also defined to include metadata describing a computer system identified by a computer system identifier.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 1:
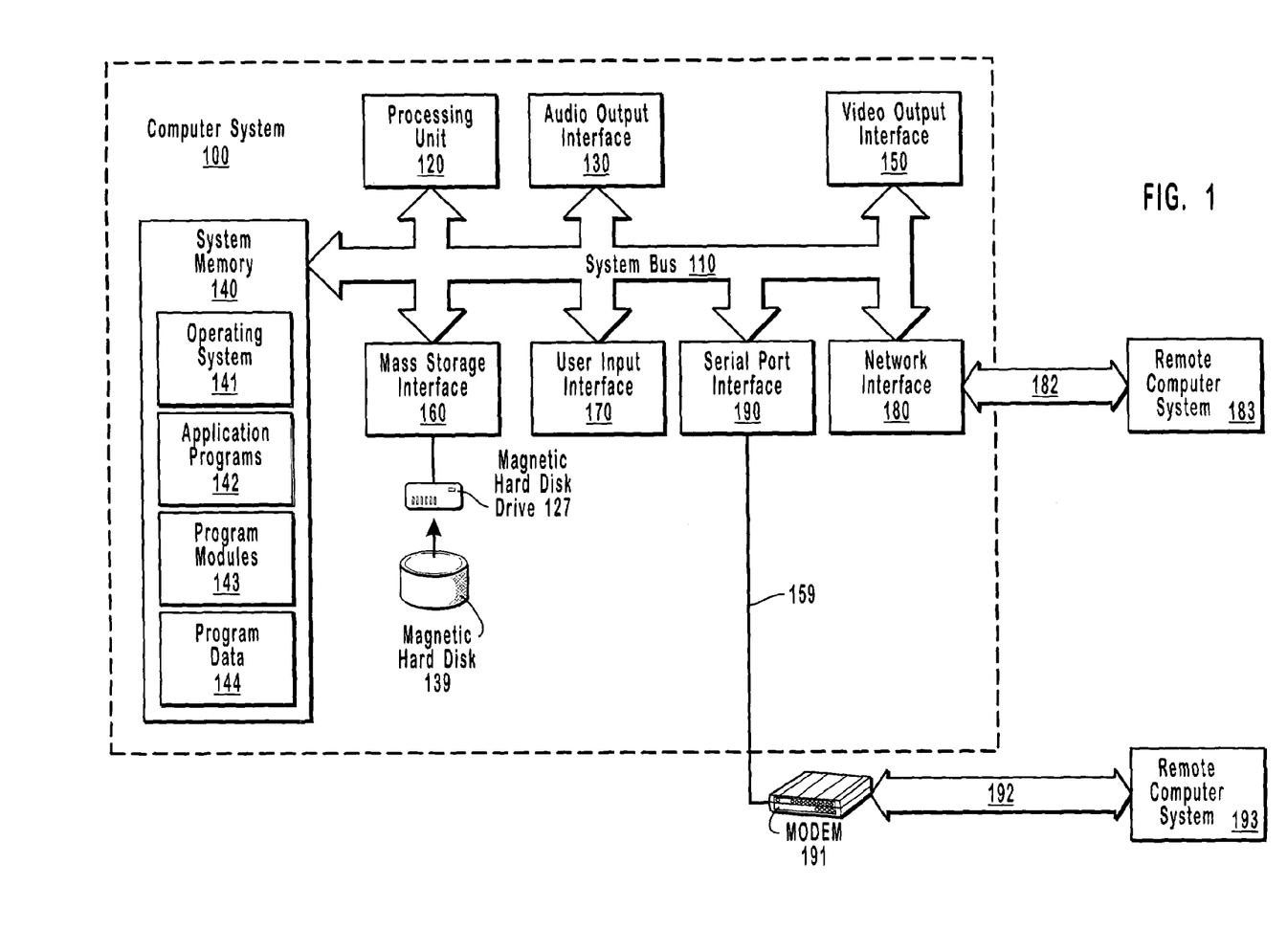
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 includes video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computer system 100. For example, magnetic hard disk 139 can store one or more program modules including operating system 141, application programs 142, other program modules 143, and program data 144.

Computer system 100 is connectable to networks, such as, for example, an office-wide or enterprise-wide computer network, an intranet, and/or the Internet. Computer system 100 can exchange data with external sources, such as, for example, remote computer systems and/or remote databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 may be a joining computer system that attempts to join computer system 100. On the other hand, remote computer system 183 may be an inviting computer system that computer system 100 attempts to join.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 may be a joining computer system that attempts to join computer system 100. On the other hand, remote computer system 193 may be an inviting computer system that computer system 100 attempts to join.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, link data processing modules, as well 4 as associated data, including link databases, link state records, computer system identifiers, timestamps, neighbor lists, metadata, and schemas may be stored and accessed from any of the computer-readable media associated with computer system 100. For example, portions of such modules and portions of associated program data may be included in operating system 141, application programs 142, program modules 143 and/or program data 144, for storage in system memory 140.

When a mass storage device, such as, for example, magnetic hard disk 139, is coupled to computer system 100, such modules and associated program data may also be stored in the mass storage device. In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2A:
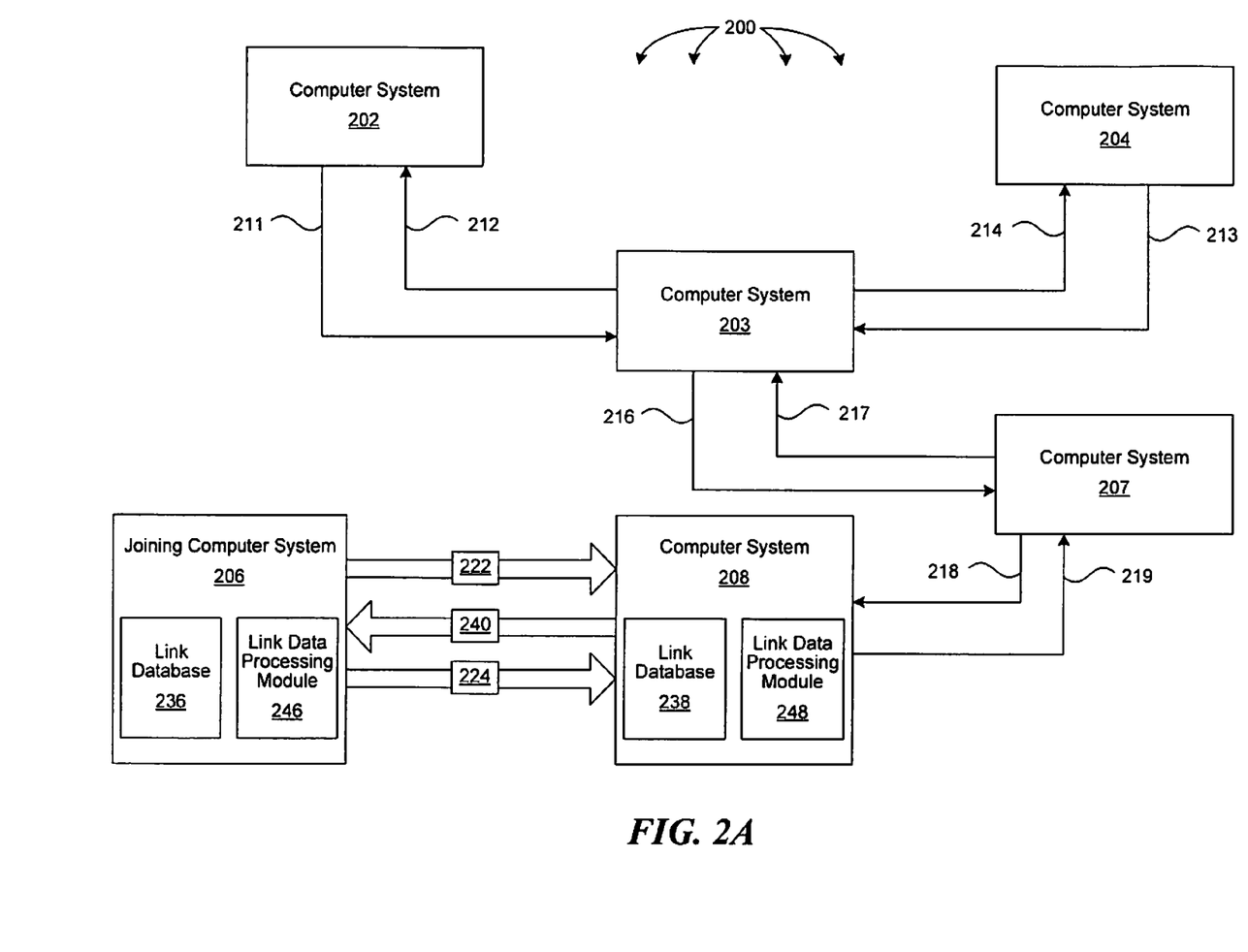
FIG. 2A illustrates an example of a network architecture that facilitates joining a multi-party conferencing session in accordance with the principles of the present inventions.

FIG. 2 illustrates example network architecture of a multi-party conferencing session 200. For clarity, multi-party conferencing session 200 is represented as a logical graph. The logical graph representation abstracts the underlying physical connections between the participating computer systems participating in multi-party conferencing session 200. Further, although not expressly depicted, the underlying physical connections between participating computer systems can be connections of virtually any network technology (e.g., Token Ring, Ethernet, IEEE 802.11, Digital Subscriber Line ("DSL"), Asynchronous Transfer Mode ("ATM"), Integrated Services Digital Network ("ISDN"), and Data Over Cable Service Interface Specification ("DOCSIS")). Each participating computer system may be physically connected to multi-party conferencing session 200 differently.

Participating in multi-party conferencing session 200 are computer systems 202, 203, 204, 207 and 208 (hereinafter referred to as "participating computer systems"). The participating computer systems are linked by corresponding logical communication links 211 through 214 and corresponding logical communication links 216 through 219 (hereinafter referred to simply as "links"). Each link depicted in multi-party conference session 200 is associated with an originating computer system and a destination computer system. The end of a link without an arrow head indicates the origin end of the link, while the end of the link with an arrow head indicates the destination end of the link. For example, link 216 originates at computer system 203 and has a destination of computer system 207.

It may be that the underlying physical connection between participating computer systems differs (e.g., due to firewalls, routers, proxies, etc) depending on the direction of data flow. Accordingly, computer systems can be multi-linked to represent the different directions of data flow. For example, the underlying physical connection for a data path from computer system 203 to computer system 202 (link 212) and the underlying physical connection for a data path computer system 202 to computer system 203 (link 211) may be different. Each participating computer system in multi-party conferencing session 200 can include a link database containing one or more link state records and a link data processing module that processes link data contained in and/or from a link state database. Link data can include membership control information indicating computer systems that are members of a multi-party application layer session and how computer systems that are members of the multi-party application layer session are connected.

Multi-party conferencing session 200 can be a real-time conferencing session. Accordingly, conferencing data, such as, for example, audio and video data, can be transferred between participating computer systems. Transfer of conferencing data can occur such that conference participants at each participating computer system can hear and/or see what all the other conferencing participants are doing. For example, conferencing data may be detected by a conferencing application at one participating computer system and transferred to corresponding conferencing applications at other participating computer systems for reproduction at the other participating computer systems.

A participating computer system can, from time to time, send heartbeat messages to other participation computer systems to verify that previously established links still exist. In response to receiving a heartbeat message, a sending participant computer system can send a sending side link database to a receiving participant computer system. The receiving participant computer system can compare time stamps (or version numbers) in the sending side link database to the stamps (or version numbers) in a receiving side link database. When results of a comparison are appropriate, the receiving computer system updates the receiving side link database with a link state record from the sending side link database. Accordingly, participant computer systems continually transition towards a steady state where each participant computer system is aware of other participant computer systems and all the links associated with other computer systems.

A link database can include a link state record for each participant computer system. For example, Table 1 logically represents an example of a link database for the participation computer systems in multi-party conferencing session 200:

TABLE 1

| Computer System | Version | Neighbors |
| --- | --- | --- |
| 202 | 4 | 203 |
| 203 | 3 | 202, 204, 207 |
| 204 | 1 | 203 |
| 207 | 5 | 203, 208 |
| 208 | 1 | 207 |

The link database represented by Table 1 can be the link database (e.g., link database 238) at each participating computer system in multi-party conferencing session 200 before joining computer system 206 attempts to join multi-party conferencing session 200. Each row of Table 1 represents a link state record for a participating computer system. For example, the row for computer system 207 indicates a version number of "5" and that computer system 207 has links to computer system 203 (link 217) and computer system 208 (link 218).

A link state record can be a data structure used to maintain link data for a participating computer system. For example, each participating computer system participating in multi-party conferencing session 200 can be associated with a corresponding link state record. A link state record can be of virtually any format. However, the following is an example link data structure representing a link state record:

```
1.  Link_State_Record
2.  {
3.      Computer System Identifier Field,
4.      Computer System Metadata Field,
5.      Neighbor List Field,
6.      Timestamp Field,
7.  }
```

Line 3 of the example link data structure is a "Computer System Identifier Field" representing a computer system identifier for identifying a participating computer system. A computer system identifier value can include, for example, a network address (e.g., an Internet Protocol ("IP") address) or a Uniform Resource Identifier ("URI") (e.g., a Uniform Resource Locator "URL")). Line 4 of the example link data structure is a "Computer System Metadata Field" representing metadata used to describe the participating computer system identified at line 3. A Metadata value can include, for example, a descriptive name used to reference the participating computer system identified at line 3.

Line 5 of the example link data structure is a "Neighbor List Field" representing a list of neighbor computer systems for the participating computer system identified at line 3. A neighbor list value can include, for example, a plurality of computer system identifiers identifying other participating computer systems that are linked to the participating computer system identified at line 3. Line 6 of the example link data structure is a "Timestamp Field" representing a time the participating computer system identified at line 3 generated the example link data structure. A timestamp value can include, for example, an absolute time value (e.g., 12:05 PM), a differential time value (e.g., 5 minutes), a version number (e.g., 1, 2, 3, etc.), or an index value. An index value can be of virtually any data type, such as, for example, string, character, integer, floating point, or even user-defined data types.

It may be that computer systems participating in multi-party conferencing session 200 advertise one or more entry points (e.g., computer system addresses and routing information) that can be utilized by a joining computer system to attempt join multi-party conferencing session 200. For example, computer system 208 may advertise an associated IP address that can be used to connect to computer system 208. Further, computer system 208 can advertise routing information, based on the network components associated with computer system 208, for appropriately routing data to computer system 208. Entry points and routing information may be advertised at lower layers (e.g., network layer and/or transport layer) of a protocol stack below an application layer (e.g., a conferencing application) that process link data. Accordingly, lower layer connection data (e.g., network layer data and/or transport layer data) can be exchanged by computer systems prior to participating computer systems exchanging link data to establish logical links. Computer systems can exchange lower layer connection data by sending and receiving electronic messages (e.g., packets, frames, etc.) of lower layer protocols (e.g., IP, Transmission Control Protocol ("TCP"), User Datagram Protocol ("UDP"), etc).

The exchange of lower layer connection data can include participating computer systems exchanging security information with joining computer systems that request to join multi-party conferencing session 200. Security information can include public keys used to authenticate participating computer systems as well as authenticate a joining computer system. For example, a group public key can be provided to a joining computer system to authenticate the participating computer systems. The joining computer system's public key, name, and session identifier can be signed with the group public key. The group public key signature allows participating computer systems to authenticate and authorize the joining computer system when it attempts to join multi-party conferencing session 200. In some embodiments, the public key of an inviting computer system is utilized to sign the joining computer system's public key, name, and session identifier.

Figure 3:
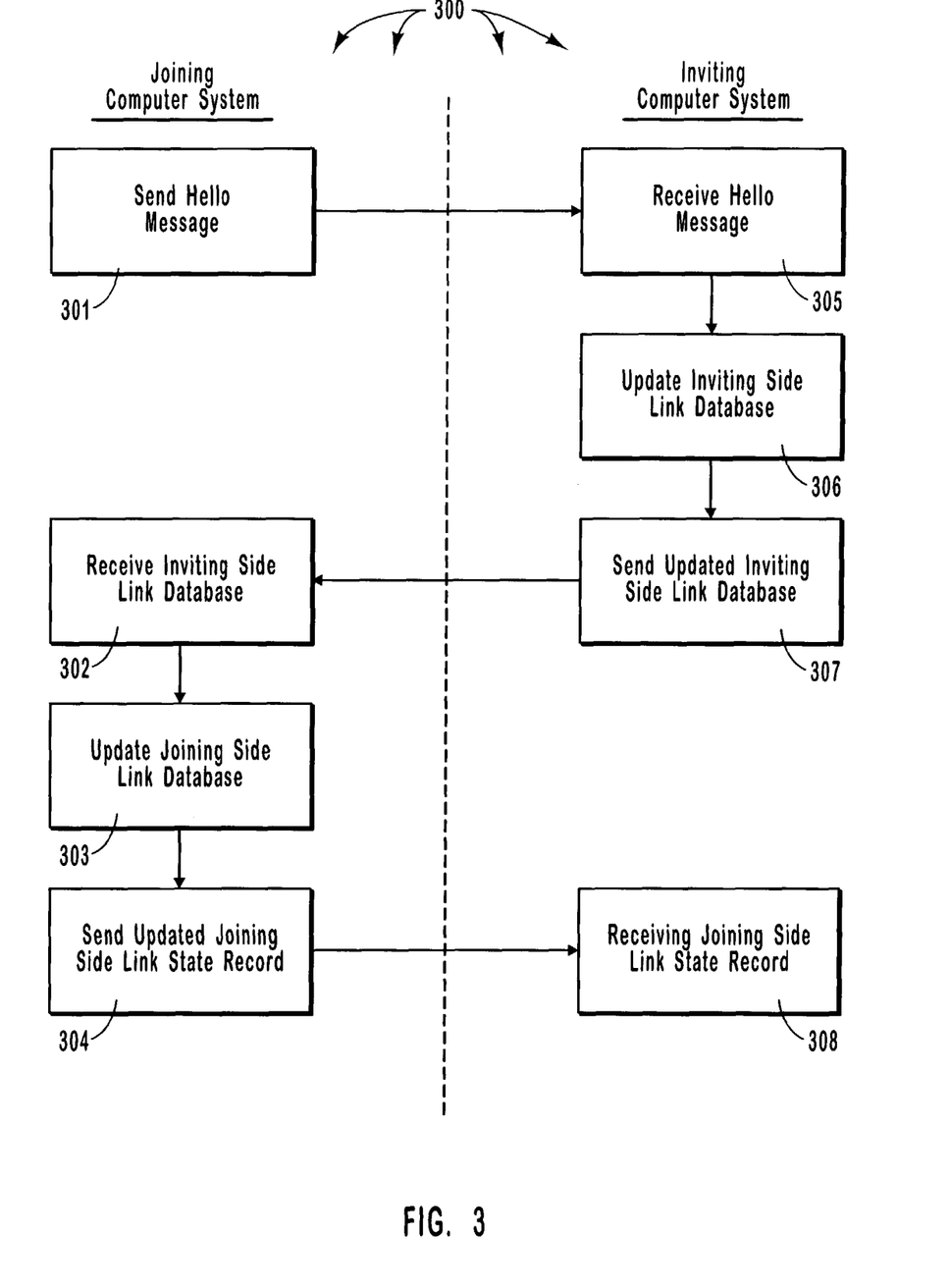
FIG. 3 illustrates an example flowchart of a method for joining a multi-party conferencing session.

FIG. 3 illustrates a flowchart of a method 300 for joining a multi-party conferencing session. The method 300 will be described with respect to the computer systems depicted in FIG. 2A.

Method 300 includes an act of sending a hello message (act 301). Act 301 can include an act of a joining computer system sending a hello message to an inviting computer system. For example, as depicted in FIG. 2A, joining computer system 206 sends hello message 222 to computer system 208. A hello message is essentially a heartbeat message that introduces a non-connected joining computer system to a computer system that is participating in multi-party application layer session. For example, hello message 222 can introduce joining computer system 206 to computer system 208 and can include a request to join multi-party conferencing session 200. Method 300 includes an act of receiving a hello message (act 305). Act 305 can include an inviting computer system receiving a hello message from a joining computer system. For example, as depicted in FIG. 2A, computer system 208 receives hello message 222 from joining computer system 206.

Method 300 includes an act of updating an inviting side link database (act 306). Act 306 can include updating an inviting side link database to indicate that the inviting computer system is linked to the joining computer system. An inviting side link database may be updated in response to receiving the hello message. For example, in response to receiving hello message 222, link data processing module 248 can update link database 238 to indicate that computer system 208 is linked to joining computer system 206.

Updating link database 238 can include adding a computer system identifier value to an appropriate neighbor list (e.g., a neighbor list contained in a link state record corresponding to computer system 208) to indicate that joining computer system 206 is a neighbor of computer system 208. Updating a link state record can also include changing a timestamp value for a time stamp field, such as, for example, by incrementing a version number, to indicate that the link state record has changed. In some embodiments, a participating computer system is only allowed to update link state records that have a Computer System Identifier field value identifying the participating computer system. Accordingly, when a link state record is received at another participating computer system, there is an increased chance that the link data contained in the link state record is accurate.

The method 300 includes an act of sending the updated inviting link database (act 307). Act 307 can include the inviting computer system sending an updated inviting side link database to the joining computer system. The inviting side link database includes at least a link state record indicating that the inviting computer system is linked to the joining computer system. For example, computer system 208 can send link database 238 to computer system 206 via Message 240 after updating link database 238 to indicate that computer system 208 is linked to joining computer system 206. In some embodiments, a sync message is used to transfer data from an updated link database.

It should be understood that the present invention is not limited to messaging using any specific transport protocol and format. However, one example protocol that may be used to implement the principles of the present invention is called Simple Object Access Protocol ("SOAP"). Link data from link database 238 may be included in a SOAP message that uses any number of lower level protocols, such as, for example, HyperText Transfer Protocol ("HTTP") or Direct Internet Message Encapsulation ("DIME") as a transport. The following represents first example XML instructions that may be included in the header and/or body of a SOAP envelope to represent a sync message that includes link data from link database 238:

```
1.  <Sync from="soap://address_208" interval="3">
2.     <Node uri="soap://address_202" name="Node 202" version=
       "4">
3.        <Link uri="soap://address_203"/>
4.     </Node>
5.     <Node uri="soap://address_203" name="Node 203" version=
       "3">
6.        <Link uri="soap://address_202"/>
7.        <Link uri="soap://address_204"/>
8.        <Link uri="soap://address_207"/>
9.     </Node>
10.    <Node uri="soap://address_204" name="Node 204" version=
       "1">
11.       <Link uri="soap://address_203"/>
12.    </Node>
13.    <Node uri="soap://address_207" name="Node 207" version=
       "5">
14.       <Link uri="soap://address_203"/>
15.       <Link uri="soap://address_208"/>
16.    </Node>
17.    <Node uri="soap://address_208" name="Node 208" version=
       "1">
18.       <Link uri="soap://address_207"/>
19.    </Node>
20. </Sync>
```

The elements within the first example XML instructions (i.e., between <Sync> and </Sync>) can include one more free-form XML documents. Likewise, the elements within the first example XML instructions can include one more XML, documents that are defined in accordance with an XML schema accessible to the computer systems participating in multi-party conferencing session 200. When a schema (e.g., an XML schema) is used to constrain the meaning of data types in a data structure (e.g., an XML data structure), there is increased flexibility to define (or even re-define) how link data is expressed.

The first example XML instructions represent a link state record for computer systems participating in multi-party conferencing session 200. Line 1 of the first example XML instructions indicate that included link state records were sent from computer system 208 (as indicated by the included URI) and that the computer system receiving the link state records (e.g., joining computer system 206) should respond within a ping interval of 3. The ping interval can be of any units, such as, for example, milliseconds, seconds, or minutes. Computer system 208's failure to receive a response from a receiving computer system within a specified threshold based on the ping interval is an indication that link data is no longer being received from the receiving computer system.

Each link state record (e.g., at lines 2-4, lines 5-9, lines 10-12, lines 13-16 and lines 17-19) is represented by a corresponding "Node" tag (i.e., between <Node and </Node>). A number of name-value pairs can be used to represent link data included in a link state record. For example, a name-value pair at line 14 represents a "uri" attribute and a corresponding uri attribute value of "soap://address_207". The value soap://address_207 is a Uniform Resource Identifier ("URI") (e.g., represented in a Computer System Identifier Field) that identifies computer system 207. Accordingly, link data that is to be sent to computer system 207 can be sent to the URI soap://address_207. Another name-value pair at line 14 represents a "name" attribute and a corresponding name attribute value of "Node 207". The value Node 207 is a descriptive name (e.g., represented in a Computer System Metadata Field) for computer system 207. Accordingly, when referring to computer system 207 the descriptive name Node 207 can be used.

Another name-value pair at line 14 represents a "version" attribute and a corresponding version attribute value of "5". The value 5 is a version of the link state record (e.g., represented in a Timestamp Field) for computer system 207. When a computer system updates a corresponding link state record, the computer system can change the version attribute value (e.g., by incrementing the version attribute value) to distinguish the updated link state record from previous link state records. Accordingly, when a computer system receives updated link data, such as, for example, link database 238, the receiving computer system can compare version numbers from current link state records to received link state records to determine the more recent link state records. When a link state record in link database 238 is more recent than a link state at a receiving computer system, the link database at the receiving computer system is updated to include the more recent link state record.

Line 14 represents a link from computer system 207 to computer system 203 (link 217). A name-value pair at line 15 represent a "uri" attribute and a corresponding uri attribute value of "soap:H/address_203". Accordingly, to send link data to computer system 203, computer system 207 can send the link data to the URI soap://address_203. Line 15 represents a link from computer system 207 to computer system 208 (link 218). A name-value pair at line 16 represent a "uri" attribute and a corresponding uri attribute value of "soap://address_208". Accordingly, to send link data to computer system 208, computer system 207 can send the link data to the URI soap://address_208. Lines 14 and 15 can be collectively represented in a Neighbor List Field.

The attributes and attribute values of other Node tags (at lines 2-4, lines 5-9, lines 10-12, and lines 17-19) represent similar link data for corresponding participating computer systems 202, 203, 204, and 208. In some embodiments, the first example XML instructions are included in the header portion of SOAP envelope, while application data (e.g., conferencing data) is included in the body portion of the SOAP envelope. Accordingly, updates to link data can be transporting along with conferencing data and do not require a separate electronic message to be generated.

In some embodiments, a hello message (e.g., similar to that utilized in acts 301 and 305) or other heartbeat message takes the form of a sync message. Accordingly, a joining computer system or participating computer system may provide an inviting computer system or another participating computer system with link state data at the time it attempts to join or re-establish connection with a multi-party application layer session. An computer system that receives a hello or heartbeat message in the form of a sync message can update a a corresponding link database to include link state data contained in the sync message. This can be particularly advantageous when a joining computer system is already connected to other computer systems (e.g., when two multi-party application layer sessions are to be connected to one another).

In some other embodiments, a hello message or other heartbeat message is a SOAP message that does not include any Node tags. The following represents second example XML instructions that can be included in the header and/or body of SOAP envelope to represent a hello or heartbeat message:

```
1.  <Sync from="soap://address_204" interval="2">
2.  </Sync>
```

Data represented in the Sync tags in the second example XML instructions can be of the same format as data represented in a sync message (e.g., in the first example XML instructions) that includes link state data (e.g., one or more Node tags). Accordingly, the same schema can be used to constrain the meaning of data types in hello messages, heartbeat messages, and sync messages. This promotes more efficient processing of hello messages, heartbeat messages, and sync messages. At line 1, the second example XML instructions indicate (by the included URI) that they were sent from computer system 204 and that the computer system receiving second example XML instructions should respond within a ping interval of 2.

Returning to FIG. 3, the method 300 includes an act of receiving an inviting side link database (act 302). Act 302 can include a joining computer system receiving an inviting side link database from the inviting computer system. For example, joining computer system 206 can receive link database 238 from computer system 208 via Message 240.

The method 300 includes an act of updating a joining side link database (act 303). Act 303 can include updating a joining side link database to at least indicate that the joining computer system is linked to the inviting computer system. For example, link data processing module 246 can update link database 236 to include a link state record indicating that joining computer system 206 is linked to computer system 208. Link data processing module 236 can also, depending on appropriate timestamp values, update link database 236 to include other link state records from link database 238. Accordingly, joining computer system 206 is aware of other participating computer systems in multi-party conferring session 200 and their corresponding links.

The method 300 includes an act of sending an updated joining side link state record (act 304). Act 304 can include the joining computer system sending an updated joining side link state record to the inviting computer system. The joining side link state record can indicate the inviting computer system that the joining computer system is linked to the inviting computer system. For example, joining computer system 206 can send link state record 224 to computer system 208. Link state record 224 can indicate to computer system 208 that joining computer system 206 is linked to computer system 208.

The method 300 includes an act of receiving the joining side link state record (act 308). Act 308 can include an inviting computer system receiving a joining side link state record from the joining computer system. For example, computer system 208 can receive link state record 224 from joining computer system 206. Link processing module 248 can update link data base 238 to include link state record 224. Joining computer system 206 is now viewed as a participating computer system.

Computer system 208 can then send the updated link database 238 to other linked participating computer systems (e.g., computer system 207). These other computer systems can then for further propagation (e.g., by transferring appropriate sync messages) updated link database 238 to yet other the participating computer systems (e.g., computer systems 203, 202 and 204) in multi-party conferencing session 200. Thus, changes in link data at one participating computer system are eventually flooded to other participating computer systems. Accordingly, multi-party conferencing session 200 continually transitions towards a steady state such that each participating computer system is aware of other participating computer systems and the corresponding links associated with the other participating computer systems.

Participating computer systems can, from time to time, attempt re-join or prove aliveness to other computer systems in multi-party conferencing session 200. Accordingly, the method 300 may be repeated between two participating computer systems. In some embodiments, a sending computer system sends a sending side sync message or, if there are no sending side link data updates, a sending side heartbeat message to receiving computer system. The sending computer system also indicates a sending side reply threshold value to the receiving computer system. A heartbeat message can include a URI identifying a participating computer system and a ping interval.

The receiving side computer system receives the sending side sync message or sending side heartbeat message and responds by sending a receiving side sync message or, if there are no receiving side link data updates, a receiving side heartbeat message to the sending computer system. The receiving side computer system also indicates a receiving side reply threshold value to the sending computer system. When the sending computer system receives the receiving side sync message or heartbeat message within the sending side reply threshold value, the sending computer system views the receiving computer system as "being alive." Likewise, the sending computer system responds to the receiving side sync message or heartbeat message by again sending a sending side sync message or a sending side heartbeat message (and indicates another sending side reply threshold value). When the receiving computer system receives the sending side sync message or sending side heartbeat message within the receiving side reply threshold value, the receiving computer system views the sending computer system as being alive.

Each participating computer system in a multi-party conferencing session can exchange sync messages and heartbeat messages with other participating computer systems in a similar manner. For example, computer system 203 can exchange sync messages containing link data with each of computer systems 202, 204, and 207. Accordingly, link data that is updated at one participating computer systems is propagated (e.g., by transferring appropriate sync messages) to other participating computer systems. For example, link data indicating that joining computer system 206 has joined multiparty conferencing session 200 is propagated from computer system 208, to computer system 207, to computer system 203, etc. Thus, at any time during a multi-party conferencing session there may be a one or more sync messages and/or one or more heartbeat messages being transferred between participating computer systems.

Figure 2B:
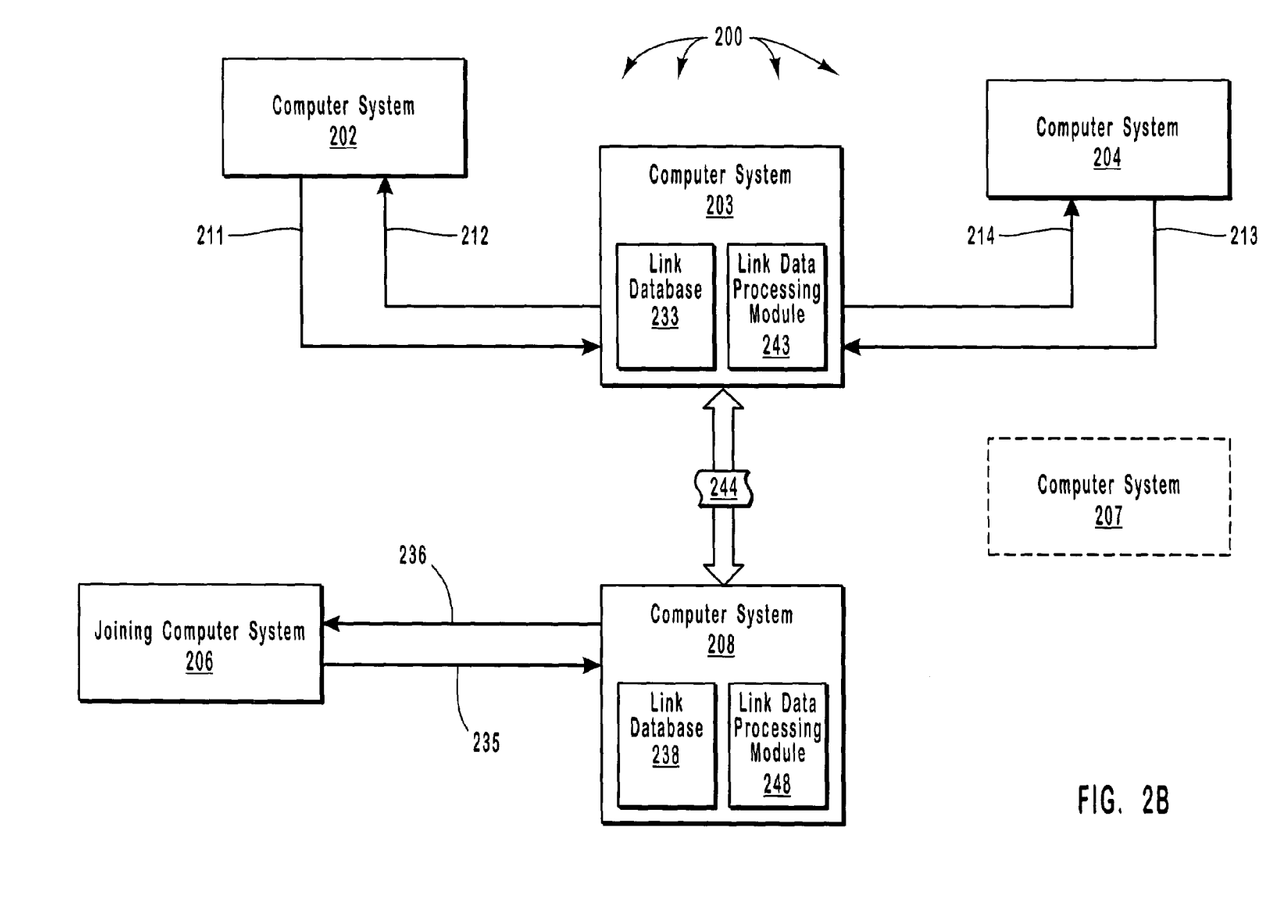
FIG. 2B illustrates an example of a network architecture that facilitates repairing a multi-party conferencing session in accordance with the principles of the present inventions.

It may be that during a multi-party conferencing session a participant computer system leaves the multi-party conference session or fails or a link between participant computer systems fails. Any of these occurrences can result in one participant computer system being unable to receive link data from another participant computer system (e.g., with a specified threshold). FIG. 2B illustrates multi-party conferencing session 200 after failure of computer system 207. Computer system 207 is depicted with a dashed line to show that link data from computer system 207 is not being received at computer systems 203 and 208 (prior neighbor computer systems). Also, depicted in FIG. 2B are links 235 and 236 that connect joining computer system 206 and computer system 208. This indicates that joining computer system 206 is a participating computer system.

Figure 4:
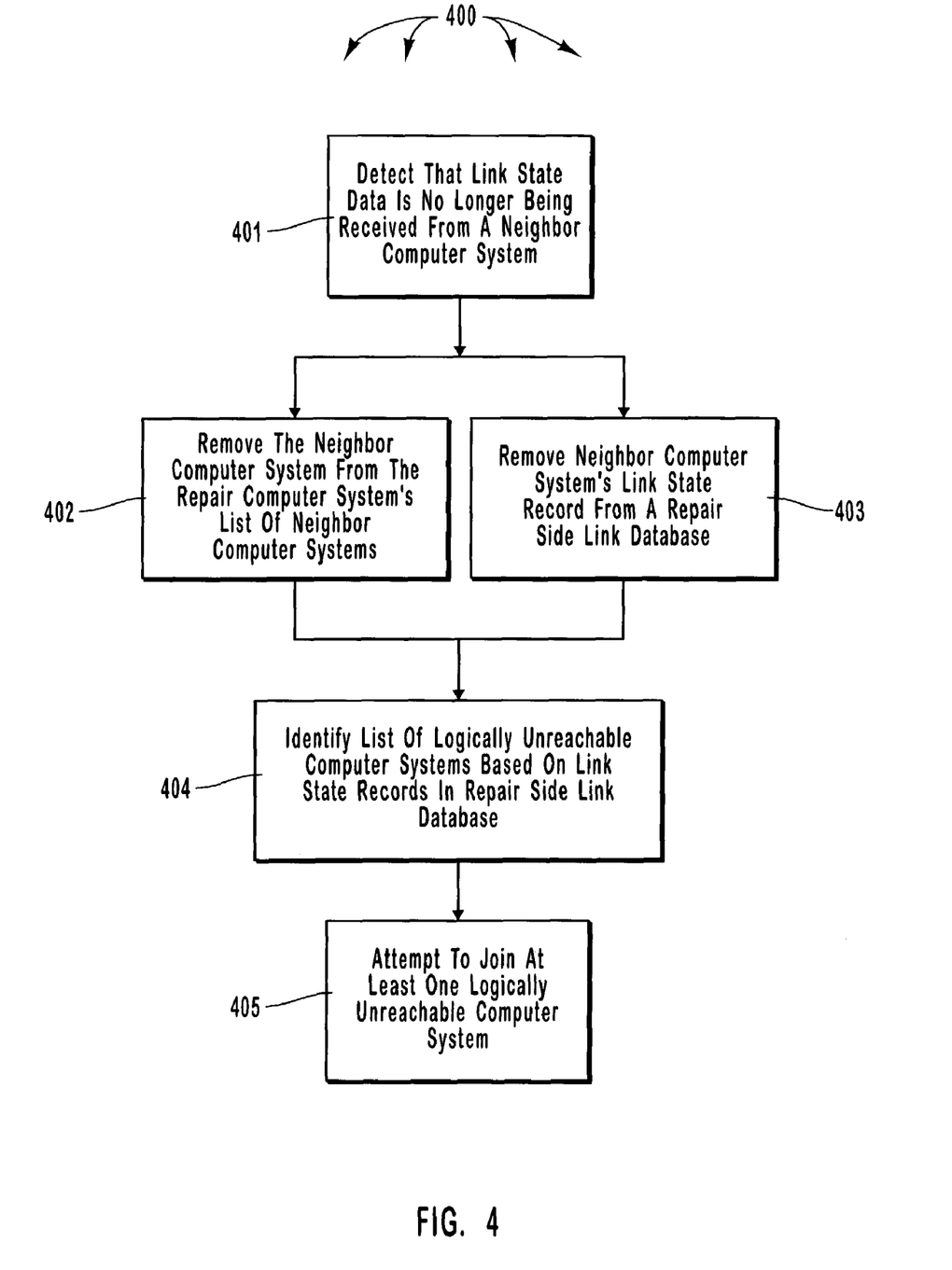
FIG. 4 illustrates an example flowchart of a method for repairing a multi-party conferencing session.

FIG. 4 is a flowchart of a method 400 for repairing a multi-party conferencing session. The method 400 will be described with respect to the computer systems depicted in FIG. 2B. The method 400 includes an act of detecting that link data is no longer being received from a neighbor computer system (act 401). Act 401 can include a repairing computer system detecting that link data is no longer being received from a neighbor computer system. For example, in FIG. 2B both computer system 203 and computer system 208 can detect that link data is no longer being received from computer system 207 (a computer system in the neighbor list of both computer system 203 and computer system 208). Detecting that link data is no longer being received can result when from the expiration of a reply timer. For example, computer system 203 may have sent the following second example XML instructions to computer system 207:

| |   |
|---|---|
| 1. | <Sync from="soap://address_203" interval="4"> |
| 2. | . |
| 3. | . |
| 4. | . |
| 5. | </Sync> |

Line 1 of the second example XML instructions indicate that the second example XML instructions were sent from a URI associated with computer system 203. Line 1 also indicates that one or more link state records represented by the vertical ellipsis at lines 2-4 have a reply interval of "4". When computer system 203 does not receive a reply from computer system 207 within a specified threshold calculated from the reply interval, computer system 203 detects that link data from computer system 207 is not being received. A specified threshold can be, for example, the product of two times the reply interval. This allows one interval for the second example XML instructions to travel from computer system 203 to computer system 207 and one interval for reply link data (e.g., link database) to travel from computer system 207 to computer system 203.

The method 400 includes an act of removing the neighbor computer system from the repair computer system's list of neighbor computer systems (act 402). The method 400 also includes an act of removing the neighbor computer system's link state record from a repair side ink database (act 403). For example, when link processing module 243 detects that link data is no longer being received from computer system 207, link processing module 243, can update link database 233 to remove references to computer system 207. Similarly, when link processing module 248 detects that link data is no longer being received from computer system 207, link processing module 248 can update link database 238 to remove references to computer system 207. Accordingly, after failure of computer system 207, appropriately updated link databases 233 and 238 may be represented by Table 2:

| Computer System | Version | Neighbors |
|---|---|---|
| 202 | 6 | 203 |
| 203 | 7 | 202, 204 |
| 204 | 3 | 203 |

-continued

| Computer System | Version | Neighbors |
|---|---|---|
| 206 | 9 | 208 |
| 208 | 2 | 206 |

The method 400 includes an act of identifying a list of logically unreachable computer systems based on link state records in the repair side link database (act 404). As depicted in FIG. 2B, joining computer system 206 and computer system 208 are no longer linked to computer system 203 after a failure of computer system 207. Accordingly, computer system 203 can identify computer systems 206 and 208 as logically unreachable. Similarly, computer system 208 can identify computer systems 202, 203, and 204 as logically unreachable.

The method 400 includes an act of attempting to join at least one logically unreachable computer system (act 405). For example, computer system 203 can send a hello message to computer system 208, computer system 208 can respond with link database 238, and computer system 203 can further reply with link database 233 (all collectively represented by link data 244). Accordingly, link databases 233 and 238 can subsequently be updated to indicate that computer system 203 and computer system 208 are neighbors. Updated link data from link databases 236 and 238 can then be propagated (e.g., by transferring appropriate sync messages) to other participating computer systems in multi-party conferencing session 200.

In some embodiments, a repairing computer system attempts to establish a link to a plurality of logically unreachable computer systems or even every logically unreachable computer system. In FIG. 2B, computer system 203 may attempt to establish a link to computer system 208 and joining computer system 206. Likewise, computer system 203 may attempt to establish a link to computer system 202, computer system 203, and computer system 204. After joining a previously logically unreachable computer system, link data at the previously logically unreachable computer system can indicate connectivity to other logically unreachable computer systems. Thus, although a participating computer system may attempt to establish a link to every logically unreachable computer system, some logically unreachable computer systems may become reachable through a participating computer system's joining to other previously logically unreachable computer systems. When a logically unreachable computer system becomes reachable, a participating computer system may refrain from attempting to join the logically unreachable computer system (since link data will be propagated to the participating computer system from other joined computer systems). This can result in a "web" of links between the participating computer systems of multi-party conferencing session 200

Link data exchanged by the computer systems in a multi-party conferencing session can be defined in accordance with the following example XML schema:

| | |
|---|---|
| 1. | <?xml version="1.0" encoding="utf-8" ?> |
| 2. | <xs:schema id="MembershipSync" xmlns:xs="http://www.w3.org/2001/XMLSchema"> |
| 3. | |
| 4. |     <xs:element name="Sync" type="SyncType" /> |
| 5. | |
| 6. |     <xs:complexType name="SyncType"> |
| 7. |         <xs:sequence> |
| 8. |             <xs:element name="Node" type="NodeType" |

```
9.              minOccurs="0"
10.             maxOccurs="unbounded" />
11.         </xs:sequence>
12.         <xs:attribute name="from" type="xs:anyURI" use=
                "required" />
13.         <xs:attribute name="interval" type="xs:short" />
14.     </xs:complexType>
15.
16.     <xs:complexType name="NodeType">
17.         <xs:sequence>
18.             <xs:element name="Link" type="LinkType"
19.                 minOccurs="0"
20.                 maxOccurs="unbounded" />
21.         </xs:sequence>
22.         <xs:attribute name="uri" type="xs:anyURI" use=
                "required" />
23.         <xs:attribute name="name" type="xs:string" use=
                "required" />
24.     </xs:complexType>
25.
26.     <xs:complexType name="LinkType">
27.         <xs:attribute name="uri" type="xs:anyURI" use=
                "required" />
28.     </xs:complexType>
29.
30. </xs:schema>
```

Lines 6-14 define a "Sync" element of a "SyncType" data type. More specifically, lines 7-11 define the SyncType data type to include zero or more "Node" elements of a "NodeType" data type, line 12 defines the SyncType data type to include a "from" attribute of a URI data type, and line 13 defines the SyncType data type to include an "interval" attribute of a short integer data type.

Lines 16-24 further define the NodeType data type. More specifically, lines 17-21 define the NodeType data type to include zero or more "Link" elements of a "LinkType" data type, line 22 defines the NodeType data type to include a "uri" attribute of a URI data type, and line 23 defines the NodeType data type to include a "name" attribute of a string data type.

Lines 26-28 further define the LinkType data type. More specifically, line 27 defines the LinkType data type to include a uri attribute of a URI data type.

Each of the participating computer systems in multi-party conferencing session 200 can have access to the example XML schema. Accordingly, each of the computer systems included in multi-party conference session 200 can process link data in accordance with the example XML schema.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method, performed by a joining side application layer process at a joining computer system having a memory and a processor, for joining a multi-party application layer session including at least an inviting computer system being network connectable to the joining computer system, the method comprising:
   with a processor, sending a hello message to the inviting computer system;
   prior to the joining computer system being joined to the multi-party application layer session, receiving an inviting side link database from the inviting computer system, the inviting side link database including an inviting side link state record indicating that the inviting computer system is logically linked to the joining computer system;
   in response to receiving the inviting side link database, with a processor, updating a joining side link database at the joining computer based on the received inviting side link database to at least indicate that the joining computer system is logically linked to the inviting computer system; and
   sending the updated joining side link database to a third computer system, the updated joining side link database including a joining side link state record indicating that the joining computer system is logically linked to the inviting computer system, wherein the third computer system is configured to update a third link database at the third computer system based on the updated joining side link database to at least indicate that the joining computer system is logically linked to the inviting computer system, wherein the joining side link state record is a schema-based XML link state record.

2. The method of claim 1, further comprising:
   receiving, at a joining side lower protocol layer situated below the joining side application layer process in a protocol stack, an entry point from a corresponding inviting side lower protocol layer prior to sending the hello message, the entry point for connecting to the inviting side computer system to exchange lower layer connection data.

3. The method of claim 1, wherein sending the hello message comprises sending a sync message including one or more link state records.

4. The method of claim 3, wherein sending the hello message comprises sending the hello message within a specified threshold of time calculated based on a reply interval sent to the joining computer system.

5. The method of claim 1, wherein receiving the inviting side link database comprises receiving one or more link state records, each link state record indicating one or more logical links between computer systems participating in the multi-party application layer session.

6. The method of claim 1, wherein receiving the inviting side link database comprises receiving a schema-based inviting side link database.

7. A first computing system having a memory and a processor for communicating with other computing systems in a multi-party session, the first computing system comprising:
   a first link database configured to store a list of neighbors of computing systems in the multi-party session, a neighbor of one computing system being a computing system that is linked to the one computing system;
   a component configured to join the first computing system to the multi-party session at least in part by sending a first hello message to a second computing system participating in the multi-party session;
   a component configured to receive a second hello message from a third computing system and, in response to receiving the second hello message from the third computing system, send an indication of the first link database to the third computing system; and
   a component configured to,
      receive an indication of a second link database from a first neighbor computing system, the second link database storing a list of neighbors of the first neighbor computing system, wherein the second link database is a schema-based link database, receive at least one XML instruction defined in accordance with the schema, and in response to receiving the indication of the second link database from the first neighbor computing system,
upon determining that the first link database is to be updated based on data of the second link database,
update the first link database based on data of the second link database, and
send an indication of the updated first link database to at least one neighbor computing system of the first computing system;

so that when a computing system joins the multi-party session, updated link databases are propagated to computing systems participating in the multi-party session.

8. The first computing system of claim 7, wherein the component configured to send the first hello message is further configured to send a sync message including one or more link state records.

9. The first computing system of claim 7, wherein the component configured to receive an indication of a second link database is further configured to receive one or more link state records, each link state record indicating one or more logical links between computing systems participating in the multi-party application layer session.

10. The first computing system of claim 7, wherein the component configured to update the first link database is further configured to add the second computing system to a neighbor list for the first computing system.

11. The first computing system of claim 7, wherein the component configured to update the first link database is further configured to replace a current version of a link state record in the first link database with an updated version of the link state record received from the second computing system.

12. A method performed by a first computer having a memory and a processor for communicating with other computers in a multi-party session, the method comprising:

storing, in a first link database, a list of neighbors of computers in the multi-party session, a neighbor of one computer being a computer that is linked to the one computer;
sending a first hello message to a second computer participating in the multi-party session;
prior to the first computer system being joined to the multi-party session, receiving an indication of a second link database from the second computer, the first link database and the second link database storing a list of neighbors of the second neighbor computer; and
in response to receiving the indication of the second link database,
upon determining that the first link database is to be updated based on data of the second link database,
with a processor, updating the first link database based on data of the second link database, and
sending an indication of the updated first link database to at least one neighbor computer of the first computer, wherein sending the indication of the updated first link database comprises sending a schema-based link state record and wherein sending the schema-based link state record comprises sending an XML link state record.

13. The method of claim 12, further comprising:
receiving a second hello message from a third computer.

14. The method of claim 13, further comprising:
in response to receiving the second hello message, sending an indication of the first link database to the third computer.

15. The method of claim 13, wherein receiving the second hello message comprises receiving the second hello message within a specified threshold of time calculated based on a reply interval sent to the third computer.

16. The method of claim 12, wherein the first computer and the second computer are both participant computers in the multi-party session prior to the first computer sending the first hello message.

* * * * *